United States Patent
Huang et al.

(10) Patent No.: US 9,794,173 B2
(45) Date of Patent: Oct. 17, 2017

(54) FORWARDING A PACKET BY A NVE IN NVO3 NETWORK

(71) Applicant: International Business Machines Corporation, Armonk, NY (US)

(72) Inventors: Denghui Huang, Hangzhou (CN); Gang Tang, Nanjing (CN); Zi Jin Tao, Wuxi (CN); MingShuang Xian, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 14/837,314

(22) Filed: Aug. 27, 2015

(65) Prior Publication Data
US 2016/0094440 A1    Mar. 31, 2016

(30) Foreign Application Priority Data

Sep. 30, 2014 (CN) .......................... 2014 1 0521094

(51) Int. Cl.
| | |
|---|---|
| *H04L 12/50* | (2006.01) |
| *H04L 12/715* | (2013.01) |
| *H04L 12/741* | (2013.01) |
| *H04L 12/46* | (2006.01) |
| *H04L 29/12* | (2006.01) |

(52) U.S. Cl.
CPC .............. *H04L 45/64* (2013.01); *H04L 45/74* (2013.01); *H04L 12/4641* (2013.01); *H04L 61/103* (2013.01)

(58) Field of Classification Search
CPC ..... H04L 45/64; H04L 45/74; H04L 61/2007; H04L 12/4641; H04L 61/103

USPC .......................................... 370/375
See application file for complete search history.

(56) References Cited

U.S. PATENT DOCUMENTS

| | | | |
|---|---|---|---|
| 8,249,057 B1 | 8/2012 | Mohaban et al. | |
| 2014/0006585 A1 | 1/2014 | Dunbar et al. | |
| 2014/0059537 A1 | 2/2014 | Kamble et al. | |
| 2014/0086253 A1* | 3/2014 | Yong ................. | H04L 12/4633 370/395.53 |
| 2014/0201733 A1 | 7/2014 | Benny et al. | |
| 2014/0233569 A1* | 8/2014 | Yong ................. | H04L 45/64 370/392 |

(Continued)

OTHER PUBLICATIONS

Kreeger et al., Network Virtualization NVE to NVA Control Protocol Requirements, Apr. 24, 2014. (From Applicant's IDS Aug. 27, 2015).*

(Continued)

*Primary Examiner* — Mang Yeung
(74) *Attorney, Agent, or Firm* — Reza Sarbakhsh

(57) ABSTRACT

A method for forwarding a packet by a first Network Virtualization Edge (NVE) in Network Virtualization Overlays, Layer 3 (NVO3) and an NVE is provided. The method comprises, in response to receiving an IP packet from a first Virtual Access Point (VAP) of the first NVE, looking up forwarding information to obtain an IP address of a second NVE; in response to lookup fails, or the IP address of the second NVE being different from an IP address of the or the second VAP being different from the first VAP, dropping the IP packet; and in response to the IP address of the second NVE being the same as an IP address of the first NVE and the second VAP being the same as the first VAP, forwarding the IP packet.

16 Claims, 6 Drawing Sheets

(56) References Cited

U.S. PATENT DOCUMENTS

2014/0307744 A1* 10/2014 Dunbar .................. H04L 45/44
 370/401
2015/0124809 A1* 5/2015 Edsall .................... H04L 45/74
 370/390

OTHER PUBLICATIONS

Huang et al., A Method and Device for Forwarding a Packet by a NVE in NVO3 Network, Sep. 30, 2014. (From Applicant's IDS Aug. 27, 2015).*

Crisan et al., "Datacenter Applications in Virtualized Networks: A Cross-layer Performance Study," IEEE, 2013, p. 1-11.

Huang et al., "A Method and Device for Forwarding a Packet by a NVE in NVO3 Network," English Translation Application and Drawings, Filed on Sep. 30, 2014, p. 1-24, China Patent Application Serial No. 201410521094.7.

IETF Datatracker, "Network Virtualization Overlays (nvo3)," nvo3 Documents, Last Modified on Aug. 18, 2015, p. 1-5, https://datatracker.ietf.org/wg/nvo3/documents/, Accessed on Aug. 20, 2015.

Jain, "Multi-Tenant Isolation and Network Virtualization in Cloud Data Centers," Washington University in Saint Louis Class Lecture, 2013, p. 1-32, Saint Louis, MO.

Kreeger et al., "Network Virtualization NVE to NVA Control Protocol Requirements," Internet Engineering Task Force Internet-Draft, Apr. 24, 2014, p. 1-12, http://tools.ietf.org/html/draft-ietf-nvo3-nve-nva-cp-req-02, Accessed on Aug. 20, 2015.

Lasserre et al., "Framework for DC Network Virtualization," Internet Engineering Task Force Internet Draft, Nov. 12, 2013, p. 1-25, http://tools.ietf.org/html/draft-ietf-nvo3-framework-04, Accessed on Aug. 20, 2015.

* cited by examiner

FORWARDING A PACKET BY A NVE IN NVO3 NETWORK

BACKGROUND

The present invention relates to network security, and more specifically, to forwarding a packet by a Network Virtualization Edge (NVE) in Network Virtualization Overlays, Layer 3 (NVO3).

With the development of cloud computing technology, virtualization has been evolved from traditional virtualization of computing resources to virtualization of all IT resources such as computing, storage, and network. A user may conveniently rent IT resources from a cloud computing data center, rather than directly purchase a physical server. By manner of such renting, a tenant may deploy computing resources as needed, reduce total cost of ownership while abstracting hardware resources into logical, uniform software virtual resources, which may also significantly reduce deployment time of IT resources, accelerate deployment of applications and quickly respond to user needs.

From perspective of network, multi-tenant technology has following requirements on network virtualization: each tenant owns an independent IP address space, and the tenant can freely plan his rented network; data between the tenants are isolated from each other; virtual computing resources of the tenant can be arbitrarily placed at where he desires, without being limited by locations of physical network resources. Network Virtualization Overlays, Layer 3, proposed by NVO3 work group of Internet Engineering Task Force (IETF), can completely meet these requirements, and has been a mainstream technology for multi-tenant network virtualization.

In a network, security is always an important issue. Whereby, one security problem is Distributed Denial of Service (DDoS) attack, and its basic principle is that an attacker sends a large number of service requests to a victim, thereby occupying a large amount of service resources, thus causing a legal user cannot get served. The DDoS attacker usually will impersonate other legal user to launch DDoS attack, so as to evade security check and source tracking, that is, a source IP in a data packet sent by the attacker is a fake IP (the source address does not exist or belongs to other virtual machine or host).

In a NOV3 network, DDoS attack also exists.

SUMMARY

Therefore, there is a need for a method and device for forwarding a packet by a NVE in a NVO3 network, which are capable of overcoming DDoS attack.

According to one aspect of the present invention, there is provided a method for forwarding a packet by a first Network Virtualization Edge (NVE) in Network Virtualization Overlays, Layer 3 (NVO3), comprising: in response to receiving an IP packet from a first Virtual Access Point (VAP) of the first NVE, looking up forwarding information by taking a source IP address of the IP packet as an IP address of a first Tenant System (TS) and by taking a first Virtual Network Identifier (VNID) to which the IP packet belongs as a VNID to which the first TS belongs, to obtain an IP address of a second NVE to which the first TS is connected and a second VAP to which the first TS is connected; in response to the lookup fails, or the IP address of the second NVE being different from an IP address of the first NVE and/or the second VAP being different from the first VAP, dropping the IP packet; and in response to the IP address of the second NVE being the same as an IP address of the first NVE and the second VAP being the same as the first VAP, forwarding the IP packet by using a destination IP address of the IP packet.

According to another aspect of the present invention, there is provided a first Network Virtualization Edge (NVE) for forwarding a packet in Network Virtualization Overlays, Layer 3 (NVO3), comprising: a first querying module configured to, in response to receiving an IP packet from a first Virtual Access Point (VAP) of the first NVE, look up forwarding information by taking a source IP address of the IP packet as an IP address of a first Tenant System (TS) and by taking a first Virtual Network Identifier (VNID) to which the IP packet belongs as a VNID to which the first TS belongs, to obtain an IP address of a second NVE to which the first TS is connected and a second VAP to which the first TS is connected; a first dropping module configured to, in response to the lookup fails, or the IP address of the second NVE being different from an IP address of the first NVE and/or the second VAP being different from the first VAP, drop the IP packet; and a first forwarding module configured to, in response to the IP address of the second NVE being the same as an IP address of the first NVE and the second VAP being the same as the first VAP, forward the IP packet by using a destination IP address of the IP packet.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, whereby the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
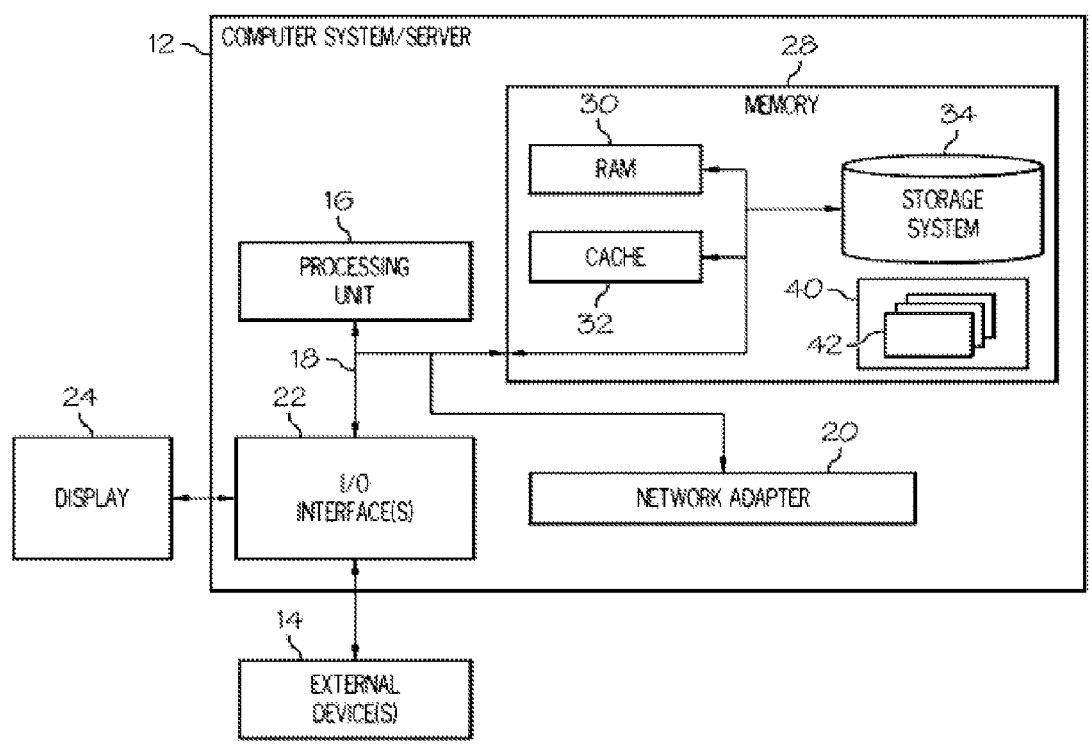
FIG. 1 shows a block diagram of an exemplary computer system/server 12 which is applicable to implement the embodiments of the present invention.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
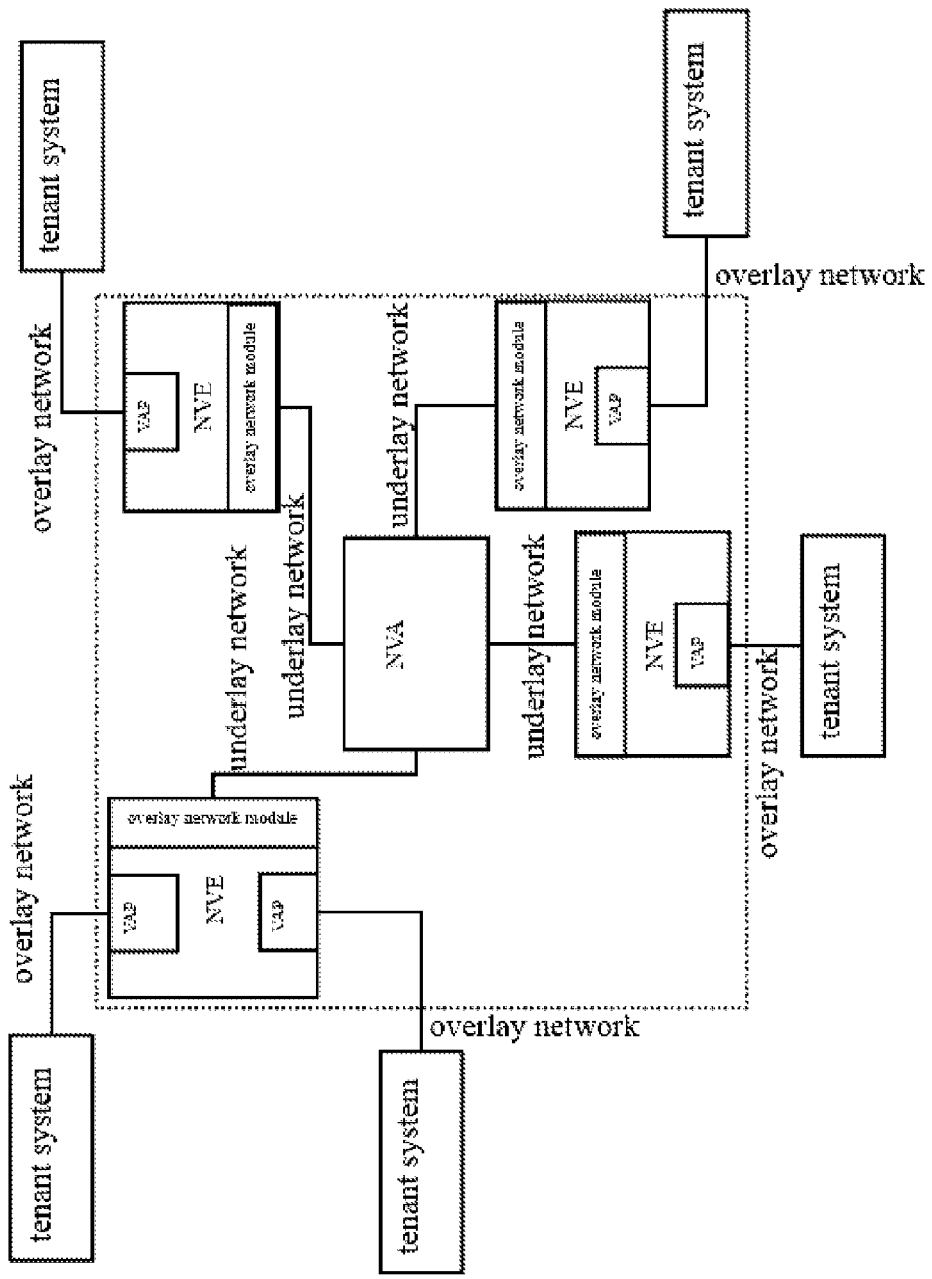
FIG. 2 schematically shows an architecture diagram of a NVO3 network.

FIG. 2 schematically shows an architecture diagram of a NVO3 network in which a method and device of the present invention can be implemented (see http://tools.ietf.org/id/draft-ietf-nvo3-framework-09.txt).

In the network shown in FIG. 2, an underlay network (also referred to as underlying network, which is an underlay network under an overlay network) is a physical network for connecting various specific physical resources. The overlay network is a virtual network, which is a new logical network constructed on basis of an original underlay network for use by each tenant. A tenant system (TS for short) may be a physical or virtual system functioning as a host, including a virtual machine (VM) running on the host, etc.; or may be a forwarding element such as a router, a switch, a firewall, etc. One TS belongs to one tenant and is connected to one or more overlay networks of that tenant. Overlay networks of all TSs carry and forward data flows through actual underlay networks. In case of a NVO3 overlay network, its underlay network is an IP network.

A Network Virtualization Edge (NVE) is a logical entity connecting an overlay network to an underlay network. The NVE is connected to a specific tenant system such as a virtual machine (VM) via Virtual Access Points (VAPs), and is also connected to the underlay network via an overlay network module, such as a Network Virtualization Authority (NVA) or other NVEs. As one NVE can be connected to multiple TS s, a Virtual Network Identifier (VNID) for distinguishing a virtual network to which a packet belongs may be used to distinguish to which TS a current VAP belongs.

The Network Virtualization Authority (NVA) implements management and control of the entire NVO3 network, it provides user with a management interface and controls forwarding information of each NVE.

A NVO3 network enabled packet forwarded over an underlay network is actually VXLAN encapsulated on an IP packet, and an encapsulated header contains a VNID of the NVO3 packet in the NVO3 network, a source IP address, a source MAC address, a destination IP address, and a destination MAC address. Since a NVO3 packet is only transmitted between NVEs, an IP packet contained in the NVO3 packet also contains an IP address of a source NVE and an IP address of a destination NVE.

In a traditional network, the most effective mechanism for filtering a fake source IP packet is an ingress filtering mechanism, which performs filtering on a router or a firewall and is responsible for checking whether a packet from a certain network indeed originates from that network. RFC2827 describes concept of ingress traffic filtering, and RFC3704 describes 5 different implementations including manual and automatic configuration. The automatic configuration mainly uses Unicast Reverse Path Forwarding (uRPF). The uRPF checks a packet entering into a router from a specific port. Whether the packet matches to an output port of a source address of the packet is determined through a FIB table of the router. If there is a match, forwarding is allowed; if there is no match or there is no routing for the source address, the packet is rejected.

Besides uRPF, another important approach in active defense field is SAVE, which is proposed by UCLA (http://lasr.cs.ucla.edu/save/). By establishing a mapping from a source address space to an ingress port, SAVE provides trace records for a router to make filtering decision. A router running SAVE algorithm sends a known source address space to a specific destination, thus routers along the path may obtain a mapping table from the correct source address space to a port.

It can be seen that, in source address validation mechanisms of traditional network, generally a legal ingress list needs to be constructed by a network device according to routing information or source address prefix information of the underlay network. Since an overlay network is a virtual network constructed over the underlay network, and its routing and source address prefix information is invisible to an underlay network device, authenticity of an address of the overlay network cannot be known. Therefore, original source address validation technique cannot be used for validation of true source address of the NVO3 network.

Currently, there is no effective module for performing access control on true address of the NVO network. In most cases, illegal packets are filtered by a manually configured Access Control List (ACL). For a data center, however, since a Virtual Machine (VM) can be dynamically created/deleted/migrated, manually configuring ACL is not an effective way. Meanwhile, if the NVE is implemented by a hardware application-specific integrated circuit (ASIC), extra Ternary Content Associative Memory (TCAM) resource is required for configuring the ACL, which is relatively expensive.

In prior art, when a TS (e.g. a VM) is connected to an overlay network, a NVE may know from registration mechanism of the TS to which VAP port of that NVE the TS is connected, and an IP address (vIP) and a MAC address (vMAC) that correspond to that TS. Meanwhile, the NVE also knows a VNID corresponding to the VAP from configuration information provided by a NVA, and the NVE can generate forwarding information for that TS according to information on these connection relationships, for example, the forwarding information may be represented by a forwarding table, i.e. a FIT (Forwarding Information Table). Those skilled in the art will appreciate that, other data structures may also be used to represent forwarding information. Table 1 shows structure of a FIT containing entries related to the present invention, whereby vMAC is MAC address of a TS; vIP is IP address of the TS; pIP is IP address of a NVE to which the TS is connected; VAP is a port to which the TS is connected; VNID is a VNID corresponding to the VAP, which may also be regarded as the VNID to which the TS belongs.

TABLE 1

| vMAC | vIP | NVE IP(pIP) | VNID | VAP |
|---|---|---|---|---|
| ... | ... | ... | ... | ... |

Forwarding information stored by the NVE is local forwarding information; meanwhile, the NVE sends the forwarding information to the NVA to form global forwarding information. Additionally, when the NVA receives the forwarding information of the NVE, the NVA needs to look up global forwarding information that has been stored to determine whether the received forwarding information of the NVE exists, and if it exists and is different from original location information, it means that TS migration occurs, and the global forwarding information needs to be updated at this moment; if it does not exist, it means that a new TS comes online, and the NVA stores the received information into the global forwarding information so that other NVEs may query the forwarding information through the NVA. The reason why local forwarding information and global forwarding information are adopted is mainly to improve forwarding efficiency. The forwarding information may be constructed and maintained through learning (e.g. Cisco VxLan) or a control protocol (e.g. IBM DOVE). The present invention is applicable to the situation in which construction is made through a control protocol, and it is assumed that the manner of constructing the forwarding information may be trusted. Since there are many approaches to protect the control protocol from being attacked, such as authentication and authorization, the assumption is reasonable.

In a NVO3 network architecture, functions presented by a NVE include: (1) receiving an IP packet sent by a TS from a VAP, whereby a destination IP address of the IP packet is another VAP to which the NVE is directly connected, and directly forwarding the IP packet to the another VAP; (2) receiving an IP packet sent by a TS from a VAP, whereby a destination IP address of the IP packet is other NVE, performing VXLAN encapsulation on the IP packet by using its overlay network module, and forwarding the encapsulated NVO3 packet to the other NVE through the NVO3 network; (3) receiving a VXLAN encapsulated NVO3 packet sent by other NVE from an underlay network, de-encapsulating it into an IP packet by using its overlay network module, whereby a destination IP address of the IP packet is another VAP to which the NVE is directly connected, and directly forwarding the IP packet to the another VAP; (4) receiving a VXLAN encapsulated NVO3 packet sent by other NVE from an underlay network, de-encapsulating it into an IP packet by using its overlay network module, whereby a destination IP address of the IP packet is other NVE, performing VXLAN encapsulation on the IP packet by using its overlay network module, and forwarding the encapsulated NVO3 to the other NVE through the NVO3 network. That is, the NVE in the NVO3 network may receive an IP packet from the overlay network, or may receive a NVO3 packet from the underlay network. Description will be given below with specific examples.

Figure 3:
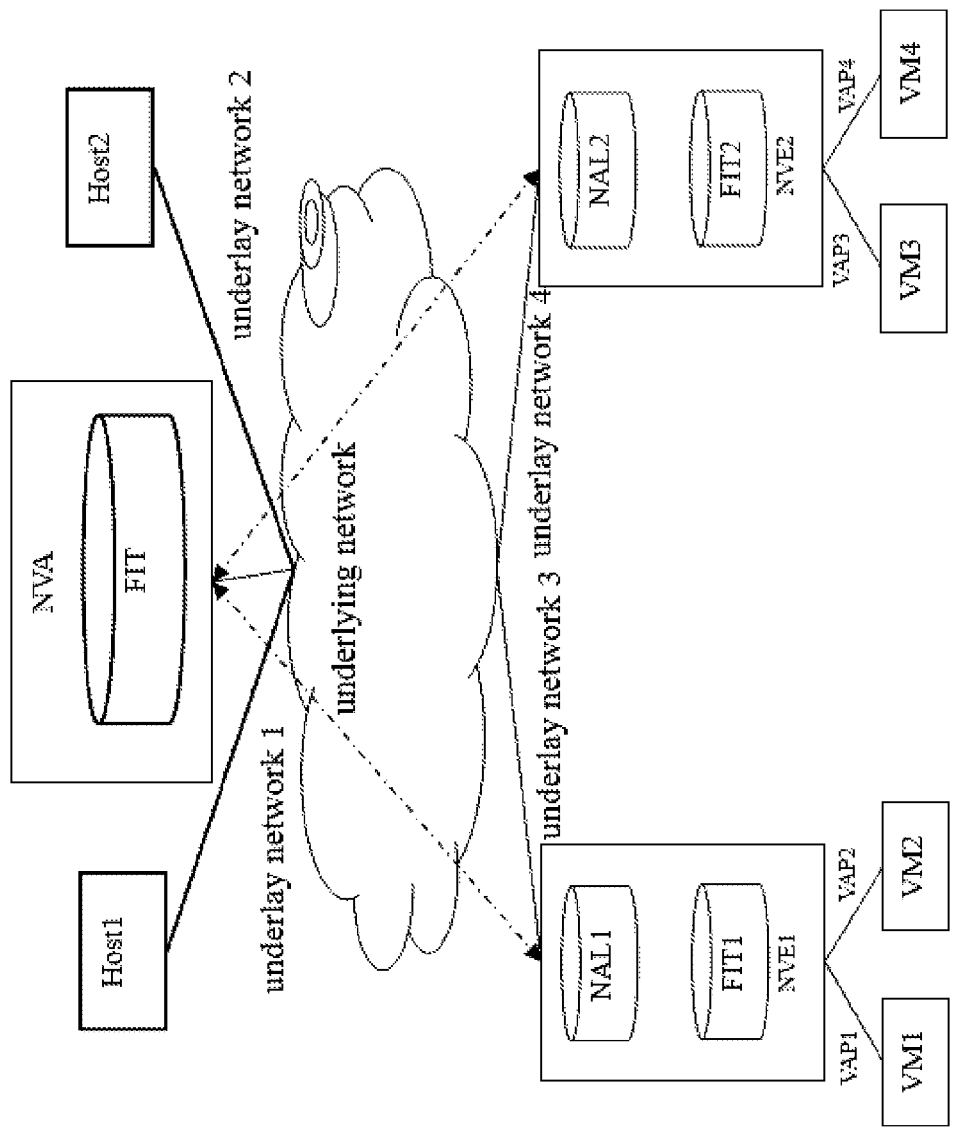
FIG. 3 shows a block diagram of schematic network structure of an existing NVO3.

FIG. 3 shows a block diagram of schematic network structure of an existing NVO3. In FIG. 3, Host1 and Host2 are taken as hosts of underlay networks and directly connected to an underlay network 1 and an underlay network 2; NVE1 and NVE2 are taken as NVE nodes and connected to an underlay network 3 and an underlay network 4; VM1, VM2, VM3, VM4 are taken as virtual machines of an overlay network, and VNIDs thereof are VNID1; VM1 and VM2 are respectively connected to VAP1 and VAP2 of NVE1; VM3 and VM4 are respectively connected to VAP3 and VAP4 of NVE2.

During construction of a FIT, the NVE1 receives notification that the VM1 and the VM2 are online, and generates forwarding information shown in Table 2 as local forwarding information of the NVE1.

TABLE 2

| vMAC | vIP | NVE IP(pIP) | VNID | VAP |
|---|---|---|---|---|
| VM1-MAC | VM1-IP | NVE1-IP | VNID1 | VAP1 |
| VM2-MAC | VM2-IP | NVE1-IP | VNID1 | VAP2 |
| ... | ... | ... | ... | ... |

The NVE2 receives notification that the VM3 and the VM4 are online, and generates forwarding information shown in Table 3 as local forwarding information of the NVE2.

TABLE 3

| vMAC | vIP | NVE IP(pIP) | VNID | VAP |
|---|---|---|---|---|
| VM3-MAC | VM3-IP | NVE2-IP | VNID1 | VAP1 |
| VM4-MAC | VM4-IP | NVE2-IP | VNID1 | VAP2 |
| ... | ... | ... | ... | ... |

Meanwhile, the NVE1 and the NVE2 will send their local forwarding information to an NVA, thus the NVA forms global forwarding information as shown in Table 4.

TABLE 4

| vMAC | vIP | NVE IP(pIP) | VNID | VAP |
|---|---|---|---|---|
| VM1-MAC | VM1-IP | NVE1-IP | VNID1 | VAP1 |
| VM2-MAC | VM2-IP | NVE1-IP | VNID1 | VAP2 |
| VM3-MAC | VM3-IP | NVE2-IP | VNID1 | VAP1 |
| VM4-MAC | VM4-IP | NVE2-IP | VNID1 | VAP2 |
| ... | ... | ... | ... | ... |

In existing forwarding information based packet forwarding process, for example, the VM1 sends an IP packet to the VM2 via the NVE1. At step 1, when receiving the IP packet, the NVE1 looks up the forwarding information of the NVE1 by using a destination IP address of the IP packet and a VNID corresponding to the destination IP address, that is, Table 2 is looked up by using the VM2-IP and the VNID1 as the vIP and the VNID in Table 2, and it is found that the pIP is NVE1-IP and the VAP is VAP2; and at step 2, the NVE1 finds that the pIP is itself and the VAP is VAP2, and thus forwards the IP packet to the VAP2.

For another example, the VM1 sends an IP packet to the VM3 via the NVE1. At step 1, at the NVE1, Table 2 is looked up by using a destination IP of the IP packet and a VNID corresponding to the destination IP address, i.e. VM3-IP and VNID1, as the vIP and the VNID in Table 2, and the lookup fails at this moment; at step 2, a query is made to the NVA in a same manner, and the lookup made by the NVA succeeds, and hence the NVA returns query information to the NVE1; at step 3, the NVE1 obtains the query information, finds that the pIP in the query information is NVE2-IP, i.e. destination NVE is the NVE2, encapsulates the IP packet into a NVO3 packet by using an overlay network module, and forwards the NVO3 packet to the NVE2; at step 4, at the NVE2, the NVO3 packet is received, and first the NVO3 packet is de-encapsulated to obtain the IP packet; at step 5, at the NVE2, Table 3 is looked up by using the destination IP address of the IP packet and the VNID corresponding to the destination IP address, i.e. the VM3-IP and the VNID1, as the vIP and the VNID, to obtain query information that the pIP is NVE2-IP and the VAP is VAP1; and at step 6, the NVE2 determines that a destination NVE of the packet is itself and the VAP is VAP1 based on the pIP being the NVE2-IP, and thus forwards the packet to the VAP1, therefore, the VM3 receives the IP packet.

From perspective of the NVO3 network, an impersonated source IP attacker may directly launch an attack in the overlay network, or may directly construct a fake VXLAN encapsulated packet in the underlay network to launch an attack against the overlay network. Viewed from the above process, neither the NVE1 nor the NVE2 has checked source IP address of the IP packet, thus the packet may be forwarded to the destination in following illegal cases: (1) the IP packet received from the VAP is sent to the VM2 or the VM4 from the VM1 in view of IP packet information, but source IP of the IP packet is the VM3, or even a nonexistent VM5, instead of the VM1; (2) a source IP address of the overlay network corresponding to the NVO3 packet sent to the NVE2 is the VM1, or the VM2, or even a nonexistent VM5, and the destination IP address is the VM3; a source IP address of a corresponding underlay network packet is the host1, and a destination IP address is NVE2; both cases are attack manners of fake source IP, however, all packets may get forwarded to corresponding destinations because the NVE merely checks destination IP addresses in forwarding. Therefore, true address of a packet cannot be determined in existing packet forwarding process of the NVO3 network, and DDos attacks cannot be prevented.

Figure 4:
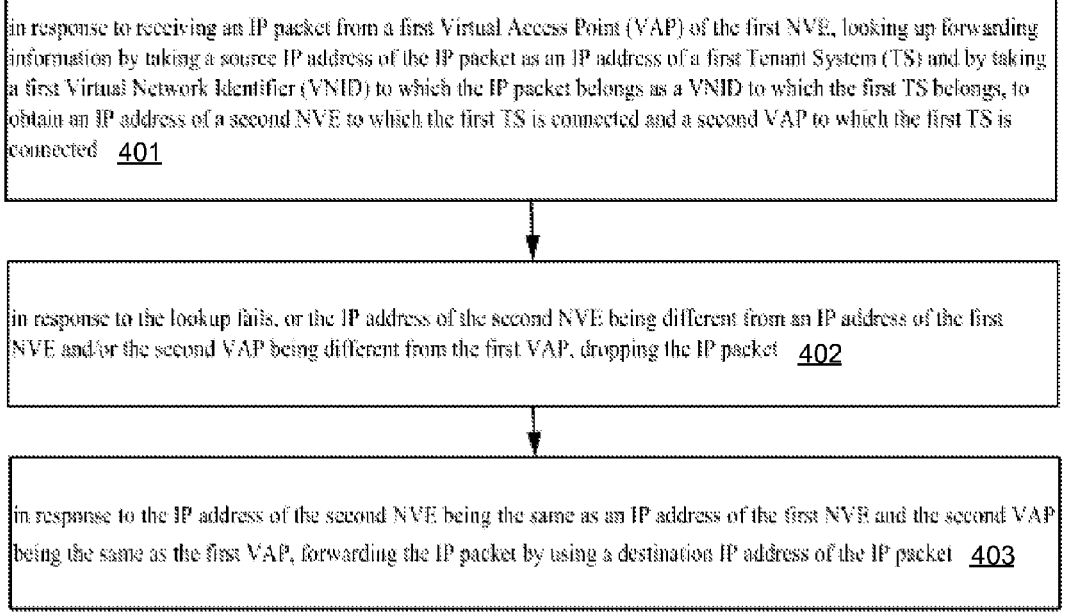
FIG. 4 shows a flow of a method for forwarding a packet by a NVE in a NVO3 network according to one embodiment of the present invention.

The present invention sets forth a method for forwarding a packet by a NVE in a NVO3 network. FIG. 4 shows a flow of the method. According to FIG. 4, at step 401, in response to receiving an IP packet from a first Virtual Access Point (VAP) of the first NVE, looking up forwarding information by taking a source IP address of the IP packet as an IP address of a first Tenant System (TS) and by taking a first Virtual Network Identifier (VNID) to which the IP packet belongs as a VNID to which the first TS belongs, to obtain an IP address of a second NVE to which the first TS is connected and a second VAP to which the first TS is connected; at step 402, in response to the lookup fails, or the IP address of the second NVE being different from an IP address of the first NVE and/or the second VAP being different from the first VAP, dropping the IP packet; at step 403, in response to the IP address of the second NVE being the same as an IP address of the first NVE and the second VAP being the same as the first VAP, forwarding the IP packet by using a destination IP address of the IP packet. Here, the step of forwarding the IP packet by using the destination IP packet of the IP packet uses the prior art described above, and detailed implementation thereof will be omitted for brevity.

In one implementation, the forwarding information in step 401 is local forwarding information stored in the first NVE. Here, there is no need to use global forwarding information in an NVA, which can improve query efficiency and forwarding speed. In another implementation, the forwarding information is global forwarding information stored in a Network Virtualization Authority (NVA) of the NVO3 network.

The method shown in FIG. 4 is applied to the example shown in FIG. 3, for example, the VM1 sends a data packet to the VM2 or the VM3 via the NVE1. In the packet forwarding process of the NVE1, first the packet sent by the VM1 is received from the VAP1, and a source IP address (VM1-IP) of the packet and a corresponding VNID (VNID1) are obtained; then forwarding information is looked up by taking the VM1-IP and the VNID1 as an IP address of the TS (VM1) and a VNID corresponding to the TS, to obtain an IP address (NVE1-IP) of an NVE to which the VM1-IP is connected and a port (VAP1) to which the VM1 is connected; the IP address of this NVE to which the VM1-IP is connected is the same as the IP address of the current NVE (NVE1), and the VAP1 to which the VM1 is connected is the same as the VAP currently receiving the IP packet, therefore, the packet is legal and can be further forwarded using the forwarding process. The forwarding process is the same as the prior art, and has been presented in the above example, description of which will be omitted for brevity. However, if a source IP address of the IP packet to be sent to the VM2, received by the NVE1 from the VAP1, is VM3-IP or even a nonexistent VM5-IP instead of the VM1-IP, at this moment, an IP address of an NVE obtained by looking up the forwarding information on the NVE1 using the source IP address of the IP packet is not the NVE1-IP, which will be different from the IP address of the current NVE1, thus the packet can be identified as a fraud packet, which belongs to DDoS attack, and the packet can be dropped.

In the example shown in FIG. 3 that the VM1 sends a data packet to the VM3 via the NVE1, the NVE2 receives a NVO3 packet through the underlay network (IP network), and the NVO3 packet may be an attack packet sent to the VM3 via the NVE1 by the host1 impersonating the VM1. At this moment, source IP address of the overlay network of the NVO3 packet is VM1-IP, destination IP address is VM3-IP, and source IP address of the IP packet thereof is IP address of the Host1. This is also a DDoS attack packet. A legal NVE directory may be stored in each NVE. Since a NVO3 packet is only transmitted between NVEs, and an IP packet contained in the NVO3 packet also contains IP address of a source NVE, source IP address of the IP packet of the NVO3 packet is just the IP address of the source NVE, therefore, the address can be found in the legal NVE directory if the source NVE is a legal NVE, and the source NVE is an illegal NVE if the address cannot be found, thus the NVO3 packet is determined as a DDoS attack packet, and the packet will be dropped; on the contrary, the packet determined to be legal will be forwarded normally.

Figure 5:
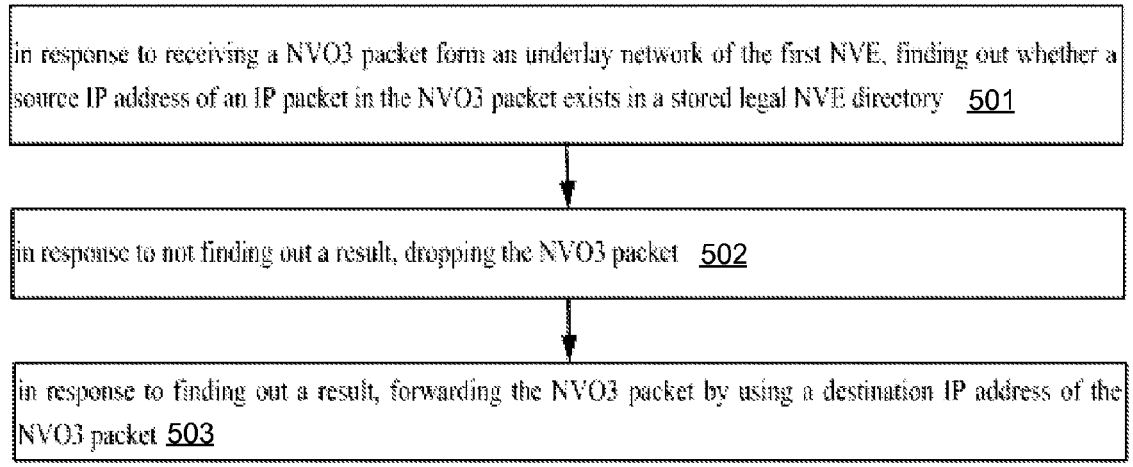
FIG. 5 schematically shows a method for forwarding a NVO3 packet received through an underlay network.

Therefore, in one implementation, a method for processing such NVO3 packet is disclosed. FIG. 5 schematically shows a method for forwarding a NVO3 packet received through an underlay network. According to FIG. 5, at step 501, in response to receiving a NVO3 packet form an underlay network of the first NVE, finding out whether a source IP address of an IP packet in the NVO3 packet exists in a stored legal NVE directory; at step 502, in response to not finding out a result, dropping the NVO3 packet; at step 503, in response to finding out a result, forwarding the NVO3 packet by using a destination IP address of the NVO3 packet. The step of forwarding the NVO3 packet by using a destination IP address of the NVO3 packet just uses the prior art in the NVO3 network, and implementation thereof will be omitted here for brevity.

The legal NVE directory is IP addresses of all legal NVEs. The legal NVE directory may be input and stored manually by a system administrator upon establishment of a network topology; or in response to establishment of a NVO3 network topology, each NVE in the NVO3 network registers with a NVA, whereby the NVA obtains the IP addresses of all the legal NVEs from registration information to form the legal NVE directory, and the NVA distributes the legal NVE directory to the each NVE. For example, during formation of Table 2 and Table 3 of FIG. 3, it is assumed that the NVE1 come online first, and then the NVE2 come online. First, the NVE1 comes online and registers its source IP address NVE1-IP on the NVA; then the NVA notifies the NVE1 that only NVE1-IP comes online, and finally the NVE1 stores a legal NVE directory as shown in Table 5. Then the NVE2 comes online and registers its source IP address NVE2-IP on the NVA, and finally the NVA notifies the NVE1 that a new NVE2-IP comes online; and the NVE1 forms a legal NVE directory as shown in Table 6. The NVA notifies the NVE2 that the NVE1-IP and NVE2-IP have been online, and the NVE2 also stores the legal NVE directory as shown in Table 6. The structure of Table 5 and Table 6 are illustrative, and those skilled in the art will appreciate that, any data structure may be used for representing a legal NVE directory.

TABLE 5

| Index | IP |
|-------|---------|
| 1     | NVE1-IP |
| ...   | ...     |

TABLE 6

| Index | IP |
|-------|---------|
| 1     | NVE1-IP |
| 2     | NVE2-IP |
| ...   | ...     |

Once a problem arises in NVE, it will cause change in the legal NVE directory. Therefore, in one implementation, a keeplive mechanism needs to be established between an online NVE and the NVA, so as to update the legal NVE directory. That is, each NVE in the NVO3 network periodically communicates with the NVA, to keep the legal NVE directory updated. In one implementation, the NVA periodically detects online status of other NVEs, that is, the NVA periodically sends an online detection request packet to all NVEs, and a NVE will respond with a detection reply packet immediately if it is online. The NVA knows that an NVE is online if the NVA can receive a detection reply packet of the NVE. However, when a reply packet of an NVE is not received within a certain period of time, it is considered that keeplive expires and the NVE is not online. The NVA notifies other NVEs to delete the expired NVE from the legal NVE directory. In another implementation, the NVA and NVEs maintain synchronous timers, that is, the NVA does not send an online detection request packet to all NVEs, and an NVE send a keeplive packet to the NVA periodically if it is online. The NVA knows that an NVE is online if the NVA can periodically receive a keeplive packet of the NVE. However, when a keeplive packet of an NVE is not received within a certain period of time, it is considered that keeplive expires and the NVE is not online. The NVA notifies other NVEs to delete the expired NVE from the legal NVE directory.

In order to further improve security, an encrypted Secure Channel is used for communication between the NVEs, for example, encryption approaches such as IPsec, SSL/TLS may be used. The encryption approaches such as IPsec, SSL/TLS have already become industry standards, and thus will not be discussed here in detail.

Figure 6:
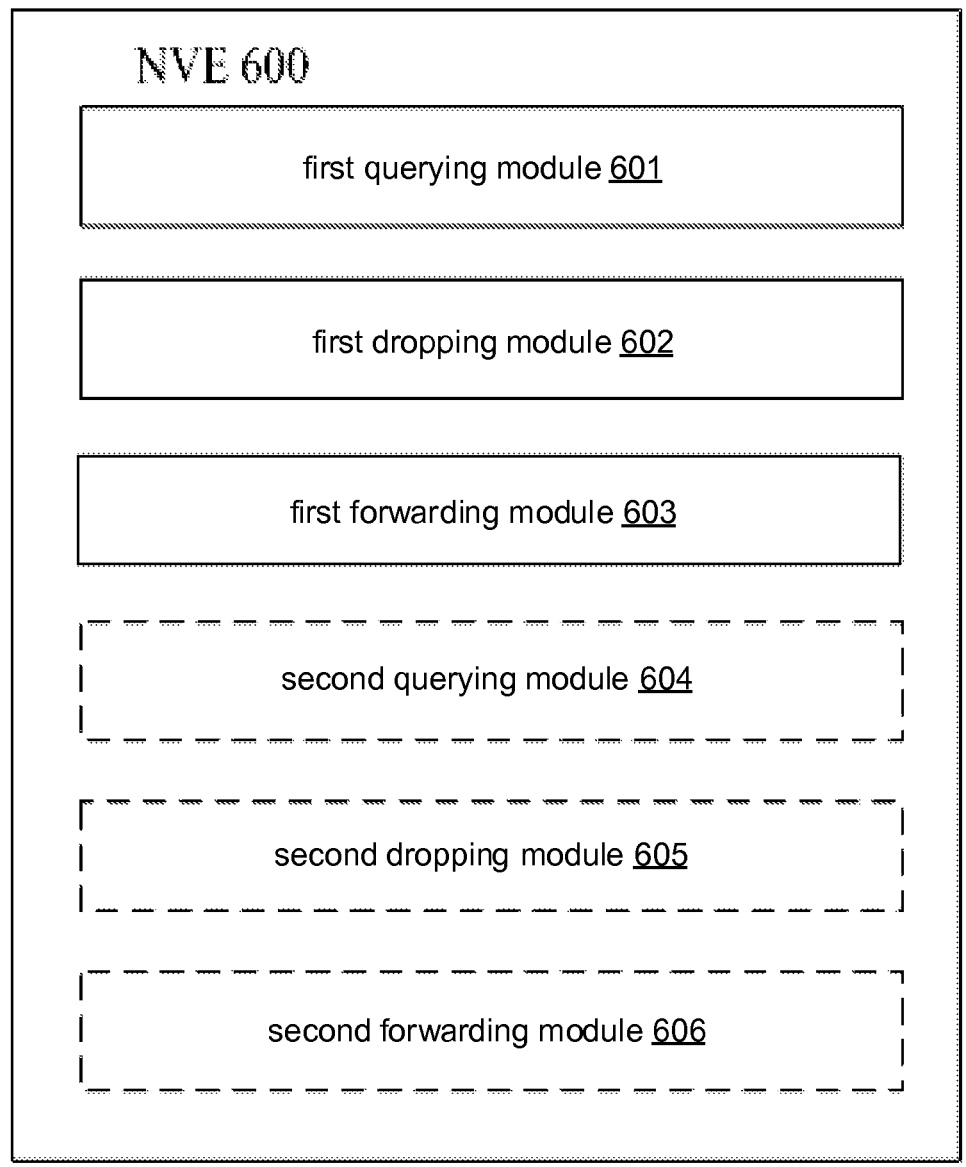
FIG. 6 schematically shows a structural block diagram of a first NVE 600.

Under a same inventive concept, an embodiment of the present invention also discloses a first Network Virtualization Edge (NVE) for forwarding a packet in Network Virtualization Overlays, Layer 3 (NVO3). FIG. 6 schematically shows a structural block diagram of a first NVE 600. According to FIG. 6, the first NVE comprising: a first querying module 601 configured to, in response to receiving an IP packet from a first Virtual Access Point (VAP) of the first NVE, look up forwarding information by taking a source IP address of the IP packet as an IP address of a first Tenant System (TS) and by taking a first Virtual Network Identifier (VNID) to which the IP packet belongs as a VNID to which the first TS belongs, to obtain an IP address of a second NVE to which the first TS is connected and a second VAP to which the first TS is connected; a first dropping module 602 configured to, in response to the lookup fails, or the IP address of the second NVE being different from an IP address of the first NVE and/or the second VAP being different from the first VAP, drop the IP packet; and a first forwarding module 603 configured to, in response to the IP address of the second NVE being the same as an IP address of the first NVE and the second VAP being the same as the first VAP, forward the IP packet by using a destination IP address of the IP packet.

In one implementation, the forwarding information is local forwarding information stored in the first NVE. In another implementation, the forwarding information is global forwarding information stored in a Network Virtualization Authority (NVA) in the NVO3 network.

In one implementation, the NVE shown in FIG. 6 further comprising: a second querying module 604 configured to, in response to receiving a NVO3 packet form an underlay network of the first NVE, find out whether a source IP address of an IP packet in the NVO3 packet exists in a stored legal NVE directory; a second dropping module 605 configured to, in response to not finding out a result, drop the NVO3 packet; a second forwarding module 606 configured to, in response to finding out a result, forward the NVO3 packet by using a destination IP address of the NVO3 packet.

In one implementation, the legal NVE directory is IP addresses of all legal NVEs. The legal NVE directory is established in a following manner: in response to establishment of a NVO3 network topology, each NVE in the NVO3 network registers with a Network Virtualization Authority (NVA), whereby the NVA obtains the IP addresses of all the legal NVEs from registration information to form the legal NVE directory, and the NVA distributes the legal NVE directory to the each NVE.

In one implementation, the legal NVE directory is maintained in a following manner: each NVE in the NVO3 network periodically communicates with the NVA, to keep the legal NVE directory updated.

Furthermore, an encrypted secure channel is used for communication between each NVE in the NVO3 network and the NVA.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create module for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for forwarding a packet by a first Network Virtualization Edge (NVE) in a Network Virtualization Overlays, Layer 3 (NVO3), the method comprising:
    a computer with one or more processors, one or more computer-readable memories, one or more computer-readable tangible storage devices, and program instructions stored on at least one of the one or more storage devices for execution by at least one of the one or more processors via at least one of the one or more memories, wherein the computer is capable of performing the method comprising:
    in response to receiving an IP packet from a first Virtual Access Point (VAP) of the first NVE, looking up forwarding information by taking a source IP address of the IP packet as an IP address of a first Tenant System (TS) and by taking a first Virtual Network Identifier (VNID) to which the IP packet belongs as a VNID to which the first TS belongs, to obtain an IP address of a second NVE to which the first TS is connected and a second VAP to which the first TS is connected;
    in response to at least one lookup fail, or the IP address of the second NVE being different from an IP address of the first NVE, or the second VAP being different from the first VAP, dropping the IP packet; and
    in response to the IP address of the second NVE being the same as an IP address of the first NVE and the second VAP being the same as the first VAP, forwarding the IP packet by using a destination IP address of the IP packet.

2. The computer-implemented method of claim 1, wherein the forwarding information is local forwarding information stored in the first NVE.

3. The computer-implemented method of claim 1, wherein the forwarding information is global forwarding information stored in a Network Virtualization Authority (NVA) in the NVO3 network.

4. The computer-implemented method of claim 1, further comprising:
    in response to receiving a NVO3 packet form an underlay network of the first NVE, finding out whether a source IP address of an IP packet in the NVO3 packet exists in a stored legal NVE directory;
    in response to not finding out a result, dropping the NVO3 packet;
    in response to finding out a result, forwarding the NVO3 packet by using a destination IP address of the NVO3 packet.

5. The computer-implemented method of claim 4, wherein the legal NVE directory comprises IP addresses of legal NVEs.

6. The computer-implemented method of claim 5, wherein the legal NVE directory is established in a following manner:
    in response to establishment of a NVO3 network topology, each NVE in the NVO3 network registers with a Network Virtualization Authority (NVA), wherein the NVA obtains the IP addresses of all the legal NVEs from registration information to form the legal NVE directory, and the NVA distributes the legal NVE directory to the each NVE.

7. The computer-implemented method of claim 6, wherein the legal NVE directory is maintained in a following manner:
    each NVE in the NVO3 network periodically communicates with the NVA, to keep the legal NVE directory updated.

8. The computer-implemented method of claim 1, wherein an encrypted secure channel is used for communication between each NVE in the NVO3 network and a Network Virtualization Authority (NVA).

9. A computer system comprising a first Network Virtualization Edge (NVE) for forwarding a packet in a Network Virtualization Overlays, Layer 3 (NVO3), comprising:
    one or more computer-readable storage devices and program instructions stored on at least one of the one or more tangible storage devices, the program instructions executable by a processor, the program instructions comprising:
    program instructions to, in response to receiving an IP packet from a first Virtual Access Point (VAP) of the first NVE, look up forwarding information by taking a source IP address of the IP packet as an IP address of a first Tenant System (TS) and by taking a first Virtual Network Identifier (VNID) to which the IP packet belongs as a VNID to which the first TS belongs, to obtain an IP address of a second NVE to which the first TS is connected and a second VAP to which the first TS is connected;

program instructions to, in response to the lookup fails, or the IP address of the second NVE being different from an IP address of the first NVE and/or the second VAP being different from the first VAP, drop the IP packet; and program instructions to, in response to the IP address of the second NVE being the same as an IP address of the first NVE and the second VAP being the same as the first VAP, forward the IP packet by using a destination IP address of the IP packet.

10. The computer system according to claim 9, wherein the forwarding information is local forwarding information stored in the first NVE.

11. The computer system according to claim 9, wherein the forwarding information is global forwarding information stored in a Network Virtualization Authority (NVA) in the NVO3 network.

12. The computer system according to claim 9, further comprising:

program instructions to, in response to receiving a NVO3 packet form an underlay network of the first NVE, find out whether a source IP address of an IP packet in the NVO3 packet exists in a stored legal NVE directory;

program instructions to, in response to not finding out a result, drop the NVO3 packet;

program instructions to, in response to finding out a result, forward the NVO3 packet by using a destination IP address of the NVO3 packet.

13. The computer system according to claim 12, wherein a legal NVE directory comprises IP addresses of legal NVEs.

14. The computer system according to claim 13, wherein the legal NVE directory is established in a following manner:

in response to establishment of a NVO3 network topology, each NVE in the NVO3 network registers with a Network Virtualization Authority (NVA), wherein the NVA obtains the IP addresses of all the legal NVEs from registration information to form the legal NVE directory, and the NVA distributes the legal NVE directory to the each NVE.

15. The computer system according to claim 14, wherein the legal NVE directory is maintained in a following manner:

each NVE in the NVO3 network periodically communicates with the NVA, to keep the legal NVE directory updated.

16. The computer system according to claim 9, wherein an encrypted secure channel is used for communication between each NVE in the NVO3 network and a Network Virtualization Authority (NVA).

* * * * *